INVENTOR.
Erling Berner
BY Eric J. Munson
Attorney

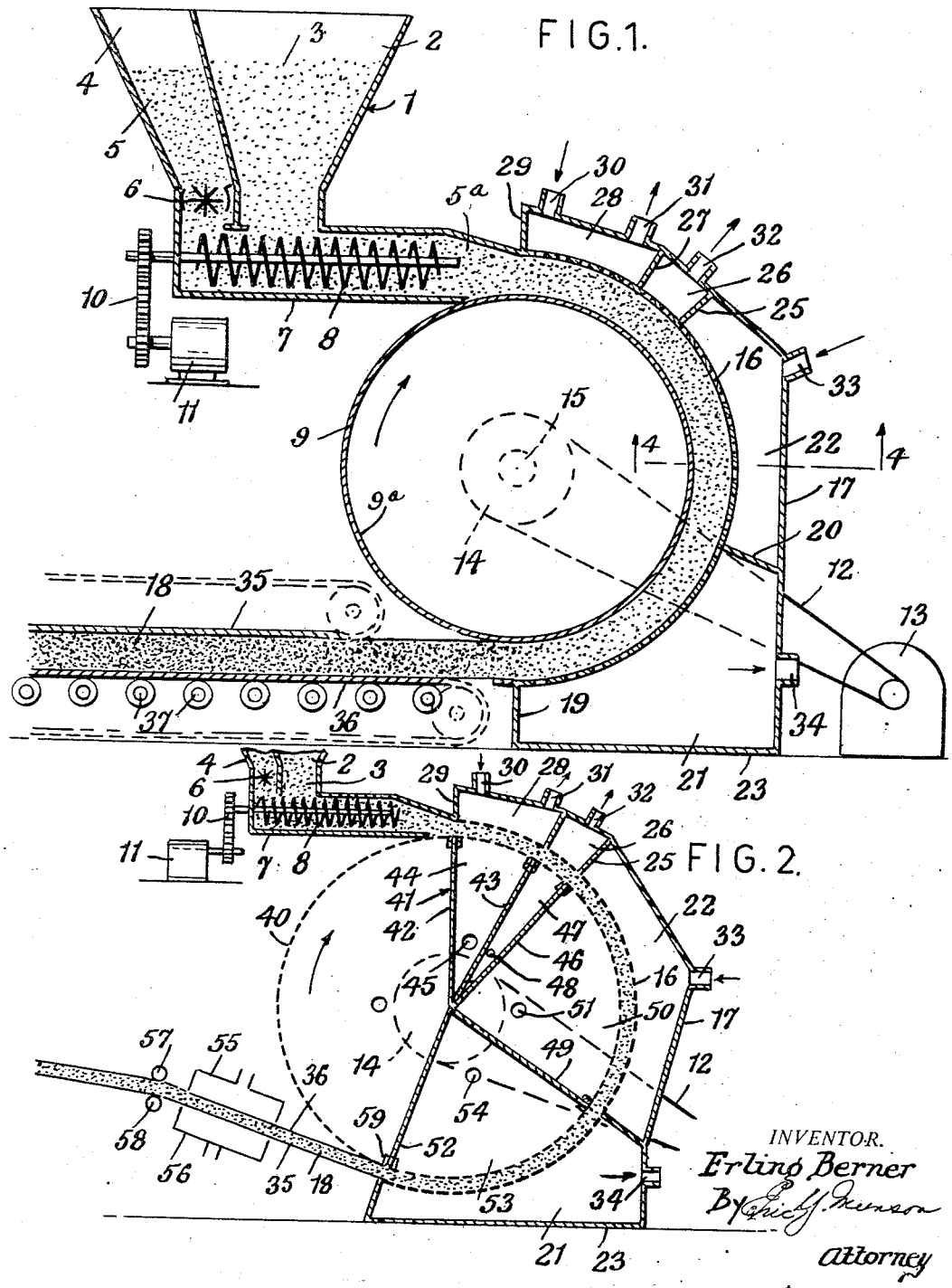

United States Patent Office 3,427,372
Patented Feb. 11, 1969

3,427,372
APPARATUS AND METHOD FOR CONTINUOUS PRODUCTION OF SLABS OR SHEETS
Erling Berner, New Castle, Pa., assignor to Berner Industries, Inc., New Castle, Pa., a corporation of Pennsylvania
Filed Oct. 17, 1966, Ser. No. 587,038
U.S. Cl. 264—51        21 Claims
Int. Cl. B29f 3/01

This invention relates to an apparatus and method for the continuous production of slabs or sheets or other articles of any desired length, composed of synthetic thermoplastic granules containing a heat expandable agent, or of other polymeric material which is expandable by the application of heat, to form a foamed, coherent porous structure.

The invention is particularly applicable to the production of insulating material, although it is not necessarily restricted thereto.

Among the objects of the invention is to provide an apparatus and method by means of which a slab or sheet of foamed polystyrene or other polymeric material can be produced by continuously charging beads or similar particles of the expanded polymeric material into a moving molding space and particularly into a space defined by arcuate surfaces of a rotating drum and an adjacent plate, while exposing the material to a fluid or gaseous heating medium, such as steam or air, and continuously discharging it from the end of the moving space.

A still further object of the invention is to provide an apparatus and method which lends itself to the production of foamed, coherent polymeric structures from granules of different densities and/or different particle size, and makes it possible to recover scrap and cuttings from the foamed structure, and by mixing it with fresh material and expanding them together into a foamed slab or sheet with consequent saving in production cost, and in the cost of the final product.

With the above and other objects to be hereinafter set forth in view, I have devised the arrangement of parts and steps to be described and more particularly pointed out in the claims appended hereto.

In the accompanying drawings, wherein illustrative embodiments of the invention are disclosed, FIG. 1 is a vertical sectional view of a continuous molding apparatus constructed in accordance with the invention;

FIG. 2 is a similar view of another embodiment of the invention;

Figures 3, 4:
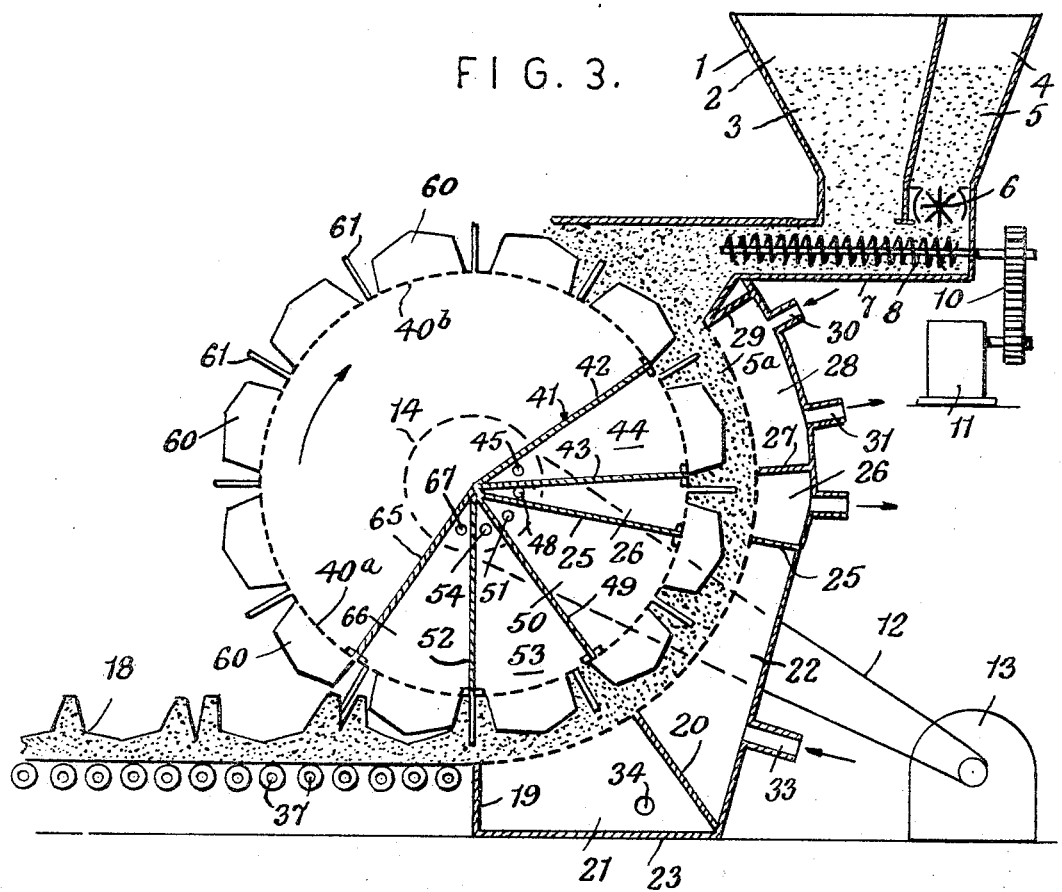
FIG. 3 is another view of a third embodiment of the invention.
FIG. 4 is a sectional view on the line 4—4 of FIG. 1.

Referring to the drawings, and more particularly to FIG. 1 thereof, there is therein shown a two-compartment hopper 1 for containing the material employed in the production of the slabs or sheets or similar products of foamed polymeric material. The compartment 2 of the hopper contains pre-expanded polystyrene beads or granules 3, while the compartment indicated at 4 may contain scrap or cuttings 5 of similar material recovered from previously formed slabs or sheets. These scraps are first broken up into small pieces by suitable means, but without causing the expanded beads thereof to become crushed or comminuted. The scraps are practically free from expanding agent and can, therefore, from the expansion point of view, be classified as a "dead" material. It will be understood that the materials 3 and 5 will be used only in cases where it is desired in the manufacture of the board or slab to use this combination of the pre-expanded beads and the scraps or cuttings or the like material.

At the lower end of the hopper compartment 4 is provided a suitably driven rotary feeder 6 which acts to continuously deliver the scrap material into a feed tube 7 wherein is located a spiral feeder 8. Said feeder 8 also receives the beads or granules 3 from the hopper compartment 2 and the scrap material and beads are intermixed by the action of the feeder 8 to produce in the mixture shown at 5a and which mixture is fed toward a rotating drum 9. The spiral feeder 8 is rotated at the required speed by means of gearing 10 driven from an electric motor shown at 11 and which motor may be a feed screw type.

The drum 9 is rotated at a desired speed and in the direction of the arrow in FIG. 1, by means of a belt or chain 12 from a suitably positioned motor 13, the belt or chain engaging a pulley or sprocket 14 provided on the shaft 15 of the drum 9. The circumferential wall 9a of the drum is imperforate and it has a smooth, polished peripheral outer surface.

Partially encircling the drum 9 for approximately one-half of the circumference of the same, is an arcuate foraminous wall of plate 16 which forms the wall of a housing 17. Said wall or plate 16 is spaced away from the periphery of the drum 9 for a distance which determines the thickness of the slab or board 18 that is formed by the present apparatus and method. This will be apparent from FIG. 1 wherein it will be seen that the material 5a, consisting in a mixture of the ingredients 3 and 5, is fed from the feed tube 7 into the space between the periphery of the imperforates drum and the face of the foraminous arcuate plate 16, such material while being moved by the rotative movement of the drum, being molded into the slab or board.

The housing 17 has a closed wall 19 at one end and a partition 20, said wall, partition and bottom wall 23, and a portion of the perforated plate 16 forming a chamber 21. Another chamber 22 is formed between the partition 20 and another partition 25. Similarly, a chamber 26 is produced between the partition 25 and the partition 27. Finally, a chamber 28 is formed between partition 27 and an end wall 29 on the housing 17.

An inlet 30, leading into the chamber 28 is provided for the admission of a cooling fluid, such as cool water or air which will cool the plate 16 and thereby the material 5a. An outlet 31 is provided for the circulation of such cooling fluid. If water is used for cooling, the plate 16 is not perforated between the partitions 27 and 29.

The outlet shown at 32, leading into the chamber 26, permits the application of suction through the chamber 26, the use of which may be optional. The inlet 33, leading into the chamber 22, is for the admission of steam or hot air required for the expansion of the polystyrene beads. Finally, suction is applied through chamber 21 by way of the outlet 34. The partial vacuum thus produced cools the material on its way from the space between the drum 9 and the plate 16 by removal of the heat of evaporation of the water which has condensed in the foam. Instead of suction, cold air or water can be used for cooling.

The plate 16 is either composed of or treated with a material which reduces the degree of friction between the polymeric material and the surface of the plate to a minimum. Thus, the surface of the plate or wall 16 may be coated, for example, with "Teflon." The speed of the drum 9 is synchronized with the speed of the spiral feeder 8 to produce a uniform flow of the material into the spacing between the periphery of the drum and the plate 16.

For dimensioning the board there can be provided stationary side guides treated with friction-resistant material and such guides can be secured to both sides of the plate 16, or side belts can be fastened to the drum 9. A combination of both is also possible as shown in FIG. 4.

As the formed board 18 passes from the drum 9 it is conveyed by a roll conveyor 37. Upper and lower guide belts 35 and 36 respectively may be provided, as shown in FIG. 1, if desired. The lower belts 36 is supported by rollers 37 and side belts may be used to confine the formed board on its travel away from the described molding apparatus to other equipment for further processing of the board. Such confining belts are known and hence are not shown in detail herein.

The structure disclosed in FIG. 2 is similar in many respects to that shown in FIG. 1 and like elements are designated by similar reference characters. In the embodiment shown in FIG. 2, the drum 40 is perforated or is foraminous for its entire circumferential area.

Located within the interior of the drum 40 and fixed or stationary in respect thereto, is an arrangement of radially-extending partitions generally indicated at 41. The partitions which are respectively designated at 42 and 43, define a compartment 44 between them, such compartment having its outlet or mouth directed toward the cooling chamber 28. A fluid inlet 45 leads into the compartment 44 and through which the cooling fluid is directed into the compartment to thereby reach and contact with the material, while the opposite face of the material is contacted by the fluid that is supplied by way of the chamber 28. The radial partition shown at 46 and the partition 43 define a compartment 47 which has its mouth or outlet aligned with the compartment 26. Partial vacuum is produced in the compartment 47 by application of suction at the outlet 48 which also creates a partial vacuum in the chamber 26.

The partitions 46 and 49 define a sector compartment 50, which compartment has its mouth aligned with the mouth of the chamber 22. Steam or hot air is admitted into the compartment 50 through an inlet 51, while at the same time a similar heating fluid is admitted into the chamber 22 through the inlet 33. Thus, steam is brought into contact with both faces of the material disposed in he space between the surface of the drum and the arcuate face of the plate or wall 16. The partitions 49 and the partition 52 define another sector compartment 53, which compartment is aligned with the chamber 21. Suction for cooling purposes is applied through the outlets 54 and 34. It should be understood that a flow of cold air or water may be used for cooling instead of the partial vacuum created by the suction.

As the foamed board or slab 18 leaves the drum it is suitably supported and conveyed by rollers 37 or belts 36 and 35 or other supporting means. In some cases it may be desirable to subject the foamed board to further steam treatment by passing it between the steam boxes indicated at 55 and 56, and pull rolls 57 and 58 may be utilized to convey the belts and the continuous lengths of foamed board to other mechanism for further operations on the slab. The various partitions comprising the unit 41 are provided with sealing elements 59 at their ends for sealing contact with the inner surface of the peripheral wall of the drum 40.

The supply of gaseous or liquid heating or cooling media to the moving material while being compressed or molded between the rotating drum and the stationary, arcuate, perforated wall, as well as the application of suction, may be varied or adjusted according to the character of the product to be produced. Therefore, while specifically designating certain of the compartments and chambers for the distribution of certain specific gases or heating or cooling fluids, or for the application of suction, it is to be understood that these compartments or chambers might be otherwise used according to the needs of any particular material being produced.

The structure shown in FIG. 3 is similar to most respects to that shown in FIG. 2 and the similar elements in FIG. 3 are designated by similar reference characters. The drum 40a in FIG. 3 is provided with a foraminous circumferential wall 40b and mounted on and projecting radially from the outer surface of such wall is a plurality of projections or protuberances 60. The protuberances 60 may be in the form of solid or hollow blocks which are arranged on the drum in spaced relation and between them may be located radially-extending fins or blades 61. These protuberances or projections, as well as the fins, may be permanently or removably attached to the circumferential wall 40b of the drum 40a, and constitute a series of molds. Their shape and arrangement may be selected according to the shape of the foamed product to be produced. For example, the article produced may be formed with ribs or recesses as desired so that it can be bent or folded into containers or desired shape. The molds may be in form of solid imperforate blocks or they may be foraminous similarly to the perforated wall 40B of the drum and the perforated stationary wall 16 depending upon the particular situation.

It will be apparent from FIG. 3, that by the arrangement of the mold elements 60 on the surface of the drum 40a, the foamed article will be given a shape corresponding to the contour of the face of the drum. By changing the shape of the elements which are attached to the periphery of the drum, the resultant contour of the foamed article will be changed accordingly.

As an alternative, the mold elements 60 may be attached to the face of the foraminous plate 16 rather than to the surface of the drum, or the plate 16 may be shaped so as to impart to the foamed article the desired shape or contour.

In the several embodiments of the invention there is provided a cylindrical rotating drum located adjacent to but spaced from a complementarily-shaped fixed surface and preferably one treated to reduce friction and which surface is foraminous to thereby permit the passage of selected gases and fluids for the required treatment of the material to foam it into a body of predetermined shape. The invention also contemplates the provision of means by which the shape of the foamed article can be selected by the provision of mold elements either on the surface of the drum or on the fixed wall adjacent thereto.

Having thus described embodiments of the invention, it is obvious that the same is not to be restricted thereto, but is broad enough to cover all structures coming within the scope of the annexed claims. In further reference to FIG. 3, it will be noted that the unit 41 includes a partition 65 which, together with the partition 52 defines a compartment 66 having an air inlet 67. Air under pressure may be entered into this compartment to impinge against the material as it leaves the drum to thereby separate the material from the drum to allow the material to be readily carried away from the drum.

A further embodiment involves the creation of a considerable force of suction in the chamber 44 which permits elimination of the spiral feeder 8 with its gearing 10 and electric motor 11. The suction from the chamber 44 through the perforated drum 40a can be created with sufficient force to draw the material needed for the molding from the hopper 2 (and from hopper 4 if desired) into the space between the drum 40a and the plate 16.

What I claim is:

1. The method of producing a foamed plastic body comprising delivering plastic granules containing a foaming agent between closely spaced arcuate surfaces of a molding channel, only one of said surfaces being movable, at least one of said surfaces having perforations therein, and passing a heating medium through said perforations to expand and mold the granules passing through said channel.

2. Method as defined in claim 1 wherein both of the molding surfaces are perforated and the heating medium enters through the perforations of one surface and is exhausted through the perforations in the opposite surface.

3. The method as defined in claim 1 wherein one molding surface is perforated and the other molding surface is imperforate and the heating medium is passed into the body of granular materials to foam and mold the same into a coherent molded and foamed body.

4. The method of producing a foamed plastic comprising, delivering expandable plastic granules between a rotating drum and a fixed foraminous arcuate wall and forcing heating and cooling media through the wall from chambers arranged around the outside of the wall to cause said media to enter through the perforations in the wall and come into contact with the material to attain the required expansion of the granules.

5. The method according to claim 4 including forcing heating and cooling media through perforations in the drum from compartments located within and stationary relative to the drum.

6. The method according to claim 5, using suction from the first stationary compartment behind the rotating drum to cause the required feeding of material.

7. In an apparatus for producing a continuously molded sheet by foaming granules of a synthetic thermoplastic material containing a heat expanding agent into a coherent foamed agglutinated body, said apparatus comprising an open-ended molding channel having opposite surfaces spaced apart between which said granules are fed for continuous expansion and molding, said channel comprising only one movable surface, at least one of said surfaces being foraminous and means disposed adjacent to said foraminous surface for introducing a heating gas through the perforations of said surface and cooling means disposed adjacent said surfaces and located downstream of said means to introduce said heating gas.

8. Apparatus as defined in claim 7 wherein one of said molding surfaces is imperforate and the other surface alone is foraminous.

9. Apparatus as defined in claim 7 wherein both of said molding surfaces are foraminous and the heating medium may pass first through one surface to enter and heat the granules being foamed and molded therein, and out through the other surface.

10. In an apparatus for producing foamed articles from polymeric material, a cylindrical rotating drum, an arcuate foraminous plate situated adjacent to and spaced from the periphery of the drum whereby spacing is provided between the surface of the drum and said foraminous plate, and heating and cooling chambers arranged relatively to the plate to thereby supply heating and cooling media through the perforations in the plate to reach and treat the material that is delivered into the spacing between the drum and plate, and means for delivering the material into such spacing.

11. In an apparatus according to claim 10, wherein the means which feeds the material into the space between the drum and foraminous plate is a screw conveyor.

12. In an apparatus according to claim 10, wherein means is provided for exerting suction through the perforations in said plate.

13. In an apparatus according to claim 10, wherein the heating and cooling chambers are adapted to eject hot and cool fluids respectively and to pass the same through the perforations in the plate and contact the material in the spacing between drum and plate.

14. In an apparatus according to claim 10, wherein both the drum and the plate are foraminous.

15. In an apparatus according to claim 10, wherein the drum is foraminous and is provided on its periphery with irregularities.

16. In an apparatus according to claim 10, wherein heating cooling and suction chambers are arranged inside of the drum, the drum having a foraminous peripheral wall through which the heating and cooling fluids can pass and the suction can be exerted.

17. In an apparatus according to claim 10, wherein heating and cooling chambers are arranged inside of the drum and on the outside of the foraminous plate.

18. In an apparatus according to claim 10, wherein heating and cooling chambers are provided on the inside of the drum and on the outside of the foraminous plate, the cooling chamber on the inside of the drum and the cooling chamber on the outside of the foraminous plate being axially aligned and the heating chamber within the drum being axially aligned with the heating chamber on the ouside of the plate, each of the chambers having an open side directed toward the space between the drum and foraminous plate.

19. In an apparatus for producing foamed plastic, a rotating drum, a housing having an arcuate foraminous wall directed toward and spaced from the periphery of the drum, means for feeding expandable plastic granules into the space between the drum and plate, the housing having a plurality of chambers, each of the chambers opening at the plate, whereby gases or fluids forced into the chambers will pass through the holes in the plate and contact with the material in the space between the drum and plate.

20. In an apparatus according to claim 19, wherein the interior of the drum is provided with a plurality of fixed compartments into which gases or fluids are projected, said compartments opening at the circumferential wall of the drum, said wall being foraminous so that such gases or fluids will pass through said wall to reach and contact with the material in the space between the drum and foraminous wall.

21. In an apparatus according to claim 20, in which the polymeric material is fed into the space between the drum and the plate by force of suction applied to the first compartment between the rotating drum.

References Cited

UNITED STATES PATENTS

| 2,595,964 | 5/1952 | Lovell | 18—4 XR |
| 2,714,081 | 7/1955 | Burgon | 64—121 XR |
| 3,335,207 | 8/1967 | Richie | 18—4 XR |
| 3,383,441 | 5/1968 | Norrhede et al. | 264—51 |

FOREIGN PATENTS

| 187,302 | 10/1956 | Austria. |
| 842,172 | 7/1960 | Great Britain. |

JULIUS FROME, *Primary Examiner.*

PHILIP E. ANDERSON, *Assistant Examiner.*

U.S. Cl. X.R.

18—4, 5; 264—122, 101